US011667780B2

(12) United States Patent
Schulz et al.

(10) Patent No.: US 11,667,780 B2
(45) Date of Patent: Jun. 6, 2023

(54) IMPACT MODIFIED STYRENE COPOLYMER COMPOSITION COMPRISING POLYSILOXANE ADDITIVE HAVING IMPROVED ABRASION CHARACTERISTICS

(71) Applicant: INEOS STYROLUTION GROUP GMBH, Frankfurt am Main (DE)

(72) Inventors: Tobias Schulz, Cologne (DE); Norbert Niessner, Friedelsheim (DE); Janna Michaelis de Vasconcellos, Sprockhoevel (DE); Hans-Werner Schmidt, Bayreuth (DE); Tristan Kolb, Bayreuth (DE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 178 days.

(21) Appl. No.: 16/633,278

(22) PCT Filed: Jul. 25, 2018

(86) PCT No.: PCT/EP2018/070136
§ 371 (c)(1),
(2) Date: Jan. 23, 2020

(87) PCT Pub. No.: WO2019/020677
PCT Pub. Date: Jan. 31, 2019

(65) Prior Publication Data
US 2020/0148872 A1  May 14, 2020

(30) Foreign Application Priority Data

Jul. 26, 2017 (EP) ..................... 17183280

(51) Int. Cl.
*C08L 25/12* (2006.01)
*C08J 3/22* (2006.01)
(52) U.S. Cl.
CPC .............. *C08L 25/12* (2013.01); *C08J 3/226* (2013.01); *C08J 2325/12* (2013.01); *C08J 2413/00* (2013.01); *C08J 2425/12* (2013.01); *C08J 2483/04* (2013.01); *C08L 2205/025* (2013.01); *C08L 2205/035* (2013.01)
(58) Field of Classification Search
CPC .............. C08L 25/12; C08L 2205/025; C08L 2205/035; C08L 25/16; C08L 51/04; C08L 55/02; C08L 83/04; C08J 3/226; C08J 2325/12; C08J 2413/00; C08J 2425/12; C08J 2483/04; C08G 77/04; C08K 3/04
USPC ...................................................... 524/504
See application file for complete search history.

(56) References Cited

U.S. PATENT DOCUMENTS

| | | |
|---|---|---|
| 3,419,634 A | 12/1968 | Vaughn et al. |
| 3,553,167 A | 1/1971 | Schnell et al. |
| 4,009,226 A | 2/1977 | Ott et al. |
| 4,075,173 A | 2/1978 | Maruyama et al. |
| 4,156,069 A | 5/1979 | Prevorsek et al. |
| 4,181,788 A | 1/1980 | Wingler et al. |
| 4,224,419 A | 9/1980 | Swoboda et al. |
| 4,311,823 A | 1/1982 | Imai et al. |
| 4,334,053 A | 6/1982 | Freitag et al. |
| 4,584,360 A | 4/1986 | Paul et al. |
| 4,605,699 A | 8/1986 | Mitulla et al. |
| 4,634,734 A | 1/1987 | Hambrecht et al. |
| 4,788,253 A | 11/1988 | Hambrecht et al. |
| 4,982,014 A | 1/1991 | Freitag et al. |
| 2008/0242779 A1 | 10/2008 | Gaggar et al. |
| 2010/0048798 A1* | 2/2010 | You .................. C08L 25/12 524/504 |
| 2011/0152418 A1 | 6/2011 | Eckel et al. |
| 2016/0297957 A1 | 10/2016 | Boeckmann et al. |
| 2017/0145201 A1 | 5/2017 | Boeckmann et al. |

FOREIGN PATENT DOCUMENTS

| | | | |
|---|---|---|---|
| CA | 1173998 A | | 9/1984 |
| CN | 104086943 A | * | 10/2014 |
| CN | 104479273 B | | 6/2017 |
| DE | 1495626 B1 | | 6/1971 |
| DE | 2232877 A1 | | 1/1974 |
| DE | 2703376 A1 | | 8/1977 |
| DE | 2714544 A1 | | 10/1977 |
| DE | 2826925 A1 | | 1/1980 |
| DE | 3000610 A1 | | 7/1980 |
| DE | 2940024 A1 | | 4/1981 |
| DE | 3007934 A1 | | 9/1981 |
| DE | 3149358 A1 | | 6/1983 |
| DE | 3334782 A1 | | 10/1984 |
| DE | 3414118 A1 | | 10/1985 |
| DE | 3832396 A1 | | 2/1990 |
| JP | 57187345 A | | 11/1982 |
| JP | 57187346 A | | 11/1982 |
| JP | 61118433 A | | 6/1986 |
| JP | 6239610 A | | 2/1987 |
| JP | 0625507 A | | 2/1994 |
| KR | 2000055258 A | * | 9/2000 .............. C08L 25/04 |

(Continued)

OTHER PUBLICATIONS

Duckett, D., "Siloxane masterbatches to improve aesthetics and performance of thermoplastic elastomers," TPE 2004, Seventh Int'l Conf. on New Opportunities for Thermoplastic Elastomers, Sep. 15-16, 2004, 211-218, abstract. (Year: 2004).*

(Continued)

*Primary Examiner* — Frances Tischler
(74) *Attorney, Agent, or Firm* — Raphael Bellum PLLC

(57) ABSTRACT

Thermoplastic polymer compositions (P) comprising at least one styrene-based polymer composition (A) comprising at least one graft copolymer (A-1), at least one organopolysiloxane compound, and optionally at least one colorant, dye or pigment, and/or at least one further additive, shows improved properties with respect to residual gloss after abrasion combined with improved melt flow characteristics while heat resistance is not affected.

16 Claims, No Drawings

(56) References Cited

FOREIGN PATENT DOCUMENTS

| WO | 2010072812 A1 | 7/2010 |
| WO | 2015078751 A1 | 6/2015 |
| WO | 2015132190 A1 | 9/2015 |
| WO | 2015150223 A1 | 10/2015 |
| WO | 201679324 A1 | 5/2016 |

OTHER PUBLICATIONS

CN 10486943 A, machine translation, Google Patents. (Year: 2014).*
CN 104479273 A, machine translation, EPO espacenet. (Year: 2015).*
Ryan et al., "Ultra-High-Molecular-Weight Functional Siloxane Additives in Polymers. Effects Processing and Properties," J. Vinyl Addit. Techn., vol. 6, No. 1, 7-19. (Year: 2000).*
KR 10-2000-0055258 A, machine translation, KIPO KIPRIS. (Year: 2000).*
W. Scholtan, H. Lange Kolloid-Z u. Z. Polymere 250, p. 782-796, 1972.
W. Wohlleben, H. Schuch, "Measurement of Particle Size Distribution of Polymer Latexes", 2010, Editors: L. Gugliotta, J. Vega, p. 129-153.
Kolloid-Zeitschrift und Zeitschrift für Polymere, Band 223, Heft 1; relevancy can be found on p. 8 lines 26-27 of the specification.

* cited by examiner

IMPACT MODIFIED STYRENE COPOLYMER COMPOSITION COMPRISING POLYSILOXANE ADDITIVE HAVING IMPROVED ABRASION CHARACTERISTICS

The present invention relates to a thermoplastic polymer composition (P) comprising at least one styrene-based polymer composition comprising at least one styrene-based graft copolymer and at least one organopolysiloxane compound. The thermoplastic polymer composition (P) is characterized by having improved residual gloss after abrasion combined with improved melt flow characteristics. Impact strength and heat resistance of the thermoplastic polymer composition (P) are substantially not negatively affected.

Impact modified styrene copolymers such as poly(acrylonitrile-butadiene-styrene) (ABS) and poly(acrylonitrile-styrene-acrylic ester) (ASA) and their blends with other thermoplastic polymers such as polycarbonate (PC) and/or polyamide (PA) are widely used in many applications, e.g. in automotive industry, electronic industry or for household goods. The popularity of these thermoplastic polymer compositions may be attributed to their balanced properties of good impact strength and melt flow characteristics, combined with a competitive price and in some cases high UV resistance.

However, articles made of the mentioned impact modified styrene copolymer compositions on the other hand exhibit characteristics with respect to residual gloss after abrasion which are insufficient for some applications (in particular for housings of electronic articles and automotive interior parts), compared to articles made from poly(methyl methacrylate) (PMMA) or articles comprising curable coatings (e.g. UV-curable coatings).

It was therefore one object of the present invention, to provide a thermoplastic polymer composition based on styrene copolymers which is able to overcome the mentioned drawbacks with respect to residual gloss after abrasion and which is still inexpensive and/or easy to be prepared as compared to alternative solutions, such as articles made of PMMA or surface coated articles.

Different thermoplastic polymer compositions having improved scratch resistance properties are known in the art. WO 2016/79324 relates to thermoplastic silicone elastomer compositions comprising a blend of an organic thermoplastic elastomer and a silicone composition. Upon vulcanization at elevated temperatures between 100° C. and 250° C., a thermoplastic elastomer is obtained which exhibits improved scratch resistance.

WO 2015/132190 relates to a scratch resistant polymer composition containing a thermoplastic organic polymer (P) and a master batch obtained from reactively mixing a thermoplastic organic polymer (A) and an organopolysiloxane (B) at a temperature at which the thermoplastic organic polymer (A) and the organopolysiloxane (B) are in liquid phases, wherein the organopolysiloxane (B) contains at least one functionality capable of reacting with the thermoplastic organic polymer (A) so that a copolymer of (A) and (B) is formed in the master batch during the reactive mixing.

WO 2010/072812 is concerned with the use of a material for the absorption of impact energy wherein the composition of the material is a mixture of at least: (a) component (A) an organic thermoplastic elastomer having a hardness below 80 shore A measured at 23° C. (ISO 868); (b) component (B) which is a non-cross-linked and substantially non-reactive silicone polymer or a cross-linked silicone polymer, with the exclusion of borated silicone polymers exhibiting dilatant properties. Examples of organic thermoplastic elastomers (A) are block copolymers having two or more hard blocks of aromatic vinyl units and one or more unsaturated, partially saturated, or fully saturated aliphatic soft blocks.

JP06025507A deals with a scratch resistant rubber-modified styrene-based resin composition. The composition comprises a copolymer of styrene-based monomer and a (meth)acrylic ester monomer in which a rubbery elastomer (e.g. a styrene-butadiene copolymer) is dispersed. Scratch resistance is achieved by the addition of an organopolysiloxane.

JP62039610A relates to a rubber-modified styrene-based resin composition which is obtained by incorporating a rubber-modified styrene based resin prepared by dissolving a rubbery polymer in a styrene-based monomer and polymerizing the resultant mixture with a organopolysiloxane and a comb-shaped copolymer having a backbone chain part consisting of a polymer of a styrene-based monomer and a side chain part consisting of a polymer of an acrylate-based monomer.

JP57187345A relates to a rubber-modified styrene resin composition containing 0.002 to 0.2 parts by weight (in terms of silicon) of an organopolysiloxane and a rubbery polymer constituting a non-rigid component dispersed therein. The rubbery polymer is composed of at least 70 wt.-% of polybutadiene wherein 15 to 30 mol-% thereof has a 1,2-vinyl bonded structure, and the average particle size of non-rigid component particles is within the range of 5 to 2.5 μm.

JP57187346A describes a rubber-modified styrene resin composition containing a rubbery polymer and an organopolysiloxane. The rubber-modified styrene resin is prepared by bulk or bulk suspension polymerization method and comprises rubbery particles having diameters in the range from 0.5 to 2.5 μm. The organopolysiloxane is added in amounts of 0.002 to 0.2 wt.-% in terms of silicon.

JP6118433A relates to a composition for foaming obtained by compounding a rubbery polymer latex (e.g. a styrene-butadiene copolymer rubber latex) with an aqueous solution of an organic or inorganic ammonium salt and an organopolysiloxane by emulsifying with an emulsifier.

In view of these prior art documents it was a further object of the present invention to provide a thermoplastic polymer composition having the above-discussed properties (i.e. high residual gloss after abrasion at competitive prices), and which is obtainable by an easy preparation method. These objects are solved by the present invention.

The present invention relates to a thermoplastic polymer composition (P) comprising (or consisting of):
(A) 82 to 99.75 wt.-% of at least one styrene-based polymer composition (A) comprising at least one styrene-based graft copolymer (A-1);
(B) 0.25 to 18, preferably 0.25 to 12, in particular 0.25 to 5 wt.-% of at least one organopolysiloxane compound;
(C) 0 to 10 wt.-% of at least one colorant, dye or pigment; and
(D) 0 to 3 wt.-% of at least one further additive;
wherein the constituents (A) to (D) sum up to 100 wt.-% of the thermoplastic polymer composition (P). Often, the compositions comprise component(s) (C) and or (D).

In a preferred embodiment of the invention, the thermoplastic polymer composition (P) comprises (or consists of):
(A) 83 to 99.75 wt.-% of at least one styrene-based polymer composition (A) comprising at least one styrene-based graft copolymer (A-1);
(B) 0.25 to 17, preferably 0.25 to 10, in particular 0.25 to 4 wt.-% of at least one organopolysiloxane compound;

(C) 0 to 10 wt.-% of at least one colorant, dye or pigment; and
(D) 0 to 3 wt.-% of at least one further additive;
wherein the constituents (A) to (D) sum up to 100 wt.-% of the thermoplastic polymer composition (P).

In a further preferred embodiment, the thermoplastic polymer composition (P) comprises (or consists of):
(A) 84 to 99.5 wt.-% of an styrene-based polymer composition (A) comprising at least one styrene-based graft copolymer (A-1);
(B) 0.5 to 16, preferably 0.25 to 8, in particular 0.25 to 3 wt.-% of at least one organopolysiloxane compound;
(C) 0 to 10 wt.-% of at least one colorant, dye or pigment; and
(D) 0 to 3 wt.-% of at least one further additive;
wherein the constituents (A) to (D) sum up to 100 wt.-% of the thermoplastic polymer composition (P).

In a further preferred embodiment, the thermoplastic polymer composition (P) comprises (or consists of):
(A) 89 to 98.5 wt.-% of an styrene-based polymer composition (A) comprising at least one styrene-based graft copolymer (A-1);
(B) 0.5 to 11, preferably 0.5 to 10, more preferably 0.25 to 6, in particular 0.25 to 3 wt.-% of at least one organopolysiloxane compound;
(C) 0.5 to 5 wt.-% of at least one colorant, dye or pigment; and
(D) 0.5 to 3 wt.-% of at least one further additive;
wherein the constituents (A) to (D) sum up to 100 wt.-% of the thermoplastic polymer composition (P).

In the following, the components (A) to (D) are described in further detail.

Styrene-Based Polymer Composition (Constituent A)

The thermoplastic polymer composition (P) comprises at least one styrene-based polymer composition (A). The styrene-based polymer composition (A) comprises at least one graft copolymer (A-1). Preferred styrene-based graft copolymers (A-1) are rubber-modified copolymers of acrylonitrile and styrene. Particularly preferred are copolymers of acrylonitrile and styrene which are graft-polymerized on rubber particles derived from polymerizing at least one conjugated diene monomer or at least one acrylate monomer.

According to the invention, the at least one graft copolymer (A-1) used is preferably composed of:
A-1.1: from 20 to 90 wt.-%, preferably from 40 to 90 wt.-%, particularly preferably from 45 to 85 wt.-%, very particularly preferably from 50 to 80 wt.-%, based on the total weight of the graft copolymer (A-1), of a graft base of one or more monomers consisting of:
  A-1.11: 70 to 100 wt.-%, preferably 75 to 100 wt.-%, particularly preferably 80 to 100 wt.-%, based on the total weight of the graft base (A-1.1), of at least one conjugated diene, in particular butadiene, and/or at least one C1 to C8 alkyl(meth)acrylate, in particular n-butyl acrylate and/or 2-ethylhexyl acrylate,
  A-1.12: 0 to 30 wt.-%, preferably 0 to 25 wt.-%, particularly preferably 0 to 20 wt.-%, based on the total weight of the graft base (A-1.1), of at least one further comonomer selected from: styrene, α-methyl styrene, acrylonitrile, methacrylonitrile, methyl methacrylate, maleic acid anhydride and N-phenylmaleimide, preferably styrene and α-methyl styrene, particularly preferably styrene;
  A-1.13: from 0 to 10 wt.-%, preferably from 0.01 to 5, particularly preferably from 0.02 to 2 wt.-%, based on the total weight of the graft base (A-1.1), of one or more polyfunctional crosslinking monomers, selected from chosen from allyl(meth)acrylate, divinylbenzene, diallylmaleate, diallylfumarate, diallylphthalate, triallylcyanurat, triallylisocyanurat and dicyclopentadienylacrylate (DCPA), which, when component A11 is acrylate, is present in amounts of at least 0.1 wt.-%;
A-1.2: from 10 to 80 wt.-%, preferably from 10 to 60 wt.-%, more preferably from 15 to 55 wt.-%, very particularly preferably from 20 to 50 wt.-%, based on the total weight of the graft copolymer (A-1), of at least one graft layer of one or more monomers consisting of:
  A-1.21: from 65 to 95 wt.-%, preferably from 70 to 90 wt.-%, particularly preferably from 75 to 85 wt.-%, based on the total weight of the graft layer (A-1.2), of at least one vinylaromatic monomer, preferably styrene and/or α-methyl styrene, in particular styrene;
  A-1.22: 5 to 35 wt.-%, preferably 10 to 30 wt.-%, particularly preferably 15 to 25 wt.-%, based on the total weight of the graft layer (A-1.2), of acrylonitrile and/or methacrylonitrile, preferably acrylonitrile; and
A-1.3: 0 to 30 wt.-%, preferably 0 to 20 wt.-%, particularly preferably 0 to 15 wt.-%, based on the total weight of the graft copolymer (A-1), of at least one further constituent selected from:
  at least one monoethylenically unsaturated monomer selected from: methyl methacrylate, maleic acid anhydride and N-phenylmaleimide, preferably methyl methacrylate and/or
  at least one molecular weight regulator, in particular a thiol-based molecular weight regulator such as tert-dodecylmercaptan.

Preferred polyfunctional crosslinking monomers are allyl (meth)acrylate and/or dicyclopentadienylacrylate (DCPA), and more preferred DCPA.

Preferably, the graft copolymer (A-1) is prepared in an emulsions polymerization process or a suspension polymerisation process. The graft base A-1.1, comprising monomers A-1.11, A-1.12 and optionally A-1.13, as well as its preparation is known and described in the literature, e.g. DE-A 28 26 925, DE-A 31 49 358 and DE-A 34 14 118.

The graft polymerization used to synthesize graft shell A-1.2 is conveniently done in the same vessel like the emulsion polymerization done for the synthesis of the graft base A-1.1. During the reaction additives, like emulsifiers, pH buffers and initiators can be added. The monomers of the graft shell, especially monomers A-1.21 and A-1.22 can be added at once to the reaction mixture or step-wise in several steps, preferably in a continuous way, added during polymerization. When monomers A-1.21 and/or A-1.22 are added in several steps typically, a multi layered graft shell A-1.2 is obtained.

Suitable emulsifiers, buffers and initiators are described e.g. in WO 2015/150223 and WO 2015/078751.

In a preferred embodiment, the styrene-based graft copolymer (A-1) is selected from poly(acrylonitrile-butadiene-styrene) (ABS) and poly(acrylonitrile-styrene-acrylic ester) (ASA) and mixtures thereof.

In a further preferred embodiment, the styrene-based graft copolymer (A-1) according to the invention is particular preferably an ABS copolymer composed of:
A-1.1: from 40 to 90 wt.-%, based on the total weight of the styrene-based graft copolymer (A-1), of a graft base consisting of:
  A-1.11: from 70 to 100 wt.-%, preferably from 90 to 99.9 wt.-%, based on the total weight of the graft base (A-1.1), of butadiene, A-1.12: 0 to 30 wt.-%, preferably 1 to 10 wt.-%, based on the total weight of the graft base (A-1.1), of styrene and A-1.2: from 10 to 60 wt.-%, based on the total weight of the styrene-based graft copolymer (A-1), of a graft comprising:
- A-1.21: from 65 to 95 wt.-%, based on the total weight of the graft layer (A-1.2), of styrene;
- A-1.22: 5 to 35 wt.-%, based on the total weight of the graft layer (A-1.2), of acrylonitrile and A-1.3: 0 to 30 wt.-%, based on the total weight of the styrene-based graft copolymer (A-1), MMA and/or tert-dodecylmercaptan.

In a further preferred embodiment, the average particle size $D_{50}$ (determined using an ultracentrifuge) of the graft base (A-1.1) of the ABS copolymer is generally from 50 to 750 nm, preferably from 60 to 600 nm, and particularly preferably from 70 to 450 nm.

Improved product characteristics were observed with respect to melt volume-flow rate and Charpy notched impact strength for these embodiments.

In an alternative preferred embodiment, the graft copolymer (A-1) according to the invention is particular preferably an ASA copolymer composed of:

A-1.1: from 40 to 90 wt.-%, based on the total weight of the styrene-based graft copolymer (A-1), of a graft base consisting of:
- A-1.11: from 70 to 99.9 wt.-%, preferably from 90 to 99.5 wt.-%, based on the total weight of the graft base (A-1.1), of at least one C1 to C8 alkyl(meth)acrylate, preferably n-butylacrylate and/or 2-ethylhexylacrylate, in particular n-butylacrylate,
- A-1.12: 0 to 30 wt.-%, preferably 1 to 10 wt.-%, based on the total weight of the graft base (A-1.1), of styrene,
- A-1.13: 0.5 to 5 wt.-%, preferably 0.1 to 5 wt.-%, in particular 0.5 to 3 wt.-%, most preferred 1 to 2.5 wt.-%, based on the total weight of the graft base (A-1.1), of at least one polyfunctional cross-linking monomer, selected from chosen from allyl(meth)acrylate, divinylbenzene, diallylmaleate, diallylfumarate, diallylphthalate, triallylcyanurat, triallylisocyanurat and dicyclopentadienylacrylate (DCPA), preferably selected from allyl(meth)acrylate and DCPA, in particular DCPA, and A-1.2: from 10 to 60 wt.-%, based on the total weight of the styrene-based graft copolymer (A-1), of a graft comprising:
- A-1.21: from 65 to 95 wt.-%, based on the total weight of the graft layer (A-1.2), of styrene;
- A-1.22: 5 to 35 wt.-%, based on the total weight of the graft layer (A-1.2), of acrylonitrile and A-1.3: 0 to 30 wt.-%, based on the total weight of the styrene-based graft copolymer (A-1), MMA.

In a further preferred embodiment, the average particle size $D_{50}$ determined using an ultracentrifuge of the graft base (A-1.1) of the ASA copolymer is generally from 50 to 1000 nm, preferably from 60 to 850 nm, and particularly preferably from 70 to 700 nm. Typically the mean particle diameter can be measured by ultracentrifugation (e.g. described in W. Scholtan, H. Lange, Kolloid-Z. u. Z. Polymere 250, S. 782 bis 796, 1972) or using Hydrodynamic Chromatography HDC (e.g. described in W. Wohlleben, H. Schuch, "Measurement of Particle Size Distribution of Polymer Latexes", 2010, Editors: L. Gugliotta, J. Vega, p. 130-153).

The mean particle diameter $D_{50}$ represents the value of the particle size distribution curve where 50 vol.-% of the particles (e.g. polyacrylate latex) have a smaller diameter and the other 50 vol.-% have a larger diameter, compared to the $D_{50}$ value. In similar way for example the $D_{90}$ values gives the particle diameter, where 90 vol.-% of all particles have a smaller diameter. The mean particle size (mass mean, dw) can be also determined by turbidity measurement as described in Lange, Kolloid-Zeitschrift und Zeitschrift für Polymere, Band 223, Heft 1.

In a preferred embodiment graft copolymer A-1 (obtained as latex) has an average particle diameter ($D_{50}$, median) of 50 to 1000 nm, preferred 90 to 700 nm. The particle size of latex particles can be governed during synthesis by suitable means known in the literature, e.g. DE-A 28 26 925.

In a further preferred embodiment of the invention the inventive process covers the synthesis of one or at least two different graft copolymers A-1-I and A-1-II, where graft copolymers differ in their mean particle size $D_{50}$. Graft copolymer A-1 especially comprises at least one of the graft copolymers A-1-I and A-1-II, wherein:

(i) Graft copolymer A-1-I has a mean particle diameter $D_{50}$ from 50 to 180 nm, preferred 80 to 150 nm, most preferred 90 to 100 nm (small size ASA rubber), and (ii) Graft copolymer A-1-II has a mean particle diameter $D_{50}$ from 200 to 800 nm, preferred 300 to 700 nm, most preferred 400 to 600 nm (large size ASA rubber).

Preferably, graft copolymer A-1-II (large size ASA rubber) has a narrow particle size distribution, where $Q=(D_{90}-D_{10})/D_{50}$ is less than 0.3, preferably less than 0.2.

As a further component, the styrene-based polymer composition (A) may comprise at least one additional thermoplastic polymer (A-2). Preferably, the at least one additional thermoplastic polymer (A-2) is selected from polycarbonate (PC), polyamide (PA), poly(styrene-acrylonitrile) (SAN), poly(α-methyl styrene-acrylonitrile) (AMSAN) and mixtures thereof.

In a further preferred embodiment of the invention, the styrene-based polymer composition (A) comprises 5 to 100 wt.-%, preferably 7 to 80 wt.-%, in particular 10 to 55 wt.-%, based on the total weight of the styrene-based polymer composition (A), of at least one styrene-based graft copolymer (A-1) and 0 to 95 wt.-%, preferably 20 to 93 wt.-%, in particular 45 to 90 wt.-%, based on the total weight of the styrene-based polymer composition (A), of at least one thermoplastic polymer (A-2) selected from polycarbonate (PC), polyamide (PA), poly(styrene-acrylonitrile) (SAN), poly(α-methyl styrene-acrylonitrile) (AMSAN) and mixtures thereof.

In an alternative embodiment of the invention, the styrene-based polymer composition (A) comprises 20 to 60 wt.-%, preferably 30 to 40 wt.-%, based on the total weight of the styrene-based polymer composition (A), of at least one styrene-based graft copolymer (A-1) (graft copolymer) and 40 to 80 wt.-%, preferably 60 to 70 wt.-%, based on the total weight of the styrene-based polymer composition (A), of at least one thermoplastic polymer (A-2) selected from polycarbonate (PC), polyamide (PA), poly(styrene-acrylonitrile) (SAN), poly(α-methyl styrene-acrylonitrile) (AMSAN) and mixtures thereof.

In a further preferred embodiment, the styrene-based polymer composition (A) comprises 20 to 60 wt.-%, preferably 30 to 40 wt.-%, based on the total weight of the styrene-based polymer composition (A), of at least one styrene-based graft copolymer (A-1) and 40 to 80 wt.-%, preferably 60 to 70 wt.-%, based on the total weight of the styrene-based polymer composition (A), of a thermoplastic polymer (A-2) comprising 40 to 60 wt.-% of SAN and 60 to 40 wt.-% AMSAN, preferably 45 to 55 wt.-% of SAN and 55 to 45 wt.-% AMSAN, based on the total weight of the thermoplastic polymer (A-2).

In a particular preferred embodiment the styrene-based polymer composition (A) comprises from 20 to 52 wt.-%, based on the total weight of the styrene-based polymer composition (A), of at least one constituent A-1; from 80 to 52 wt.-% based on the total weight of the styrene-based polymer composition (A), of at least one constituent A-2.1, selected from poly(styrene-acrylonitrile) (SAN), poly(α-methyl styrene-acrylonitrile) (AMSAN), and mixtures thereof; and from 0 to 40 wt.-%, based on the total weight of the thermoplastic polymer (A-2), of at least one constituent A-2.2, selected from polycarbonate (PC), polyamide (PA) and mixtures thereof.

Polycarbonate Component

Polycarbonate includes one or more, preferably one or two, more preferably one aromatic polycarbonate. Aromatic polycarbonate includes for example polycondensation products, for example aromatic polycarbonates, aromatic polyester carbonates.

Aromatic polycarbonates and/or aromatic polyester carbonates which are suitable according to the invention are known from the literature or may be prepared by processes known from the literature (for the preparation of aromatic polycarbonates see, for example, Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610 and DE-A 3 832 396; for the preparation of aromatic polyester carbonates e.g. DE-A 3 077 934). The preparation of aromatic polycarbonates is carried out e.g. by reaction of diphenols with carbonic acid halides, preferably phosgene, and/or with aromatic dicarboxylic acid dihalides, preferably benzenedicarboxylic acid dihalides, by the phase interface process, optionally using chain terminators, for example monophenols, and optionally using branching agents which are trifunctional or more than trifunctional, for example triphenols or tetraphenols. A preparation via a melt polymerization process by reaction of diphenols with, for example, diphenyl carbonate is also possible.

Diphenols for the preparation of the aromatic polycarbonates and/or aromatic polyester carbonates are preferably those of the formula (I)

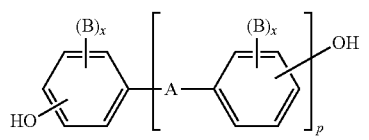

(I)

wherein A is a single bond, $C_1$ to $C_5$-alkylene, $C_2$ to $C_5$-alkylidene, $C_5$ to $C_6$-cycloalkylidene, —O—, —SO—, —CO—, —S—, —SO$_2$—, $C_6$ to $C_{12}$-arylene, on to which further aromatic rings optionally containing heteroatoms may be fused, or a radical of the formula (II) or (III),

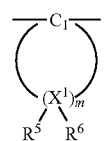

(II)

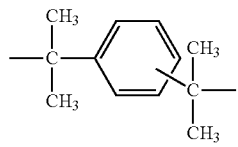

(III)

B in each case is $C_1$ to $C_{12}$-alkyl, preferably methyl, or halogen, preferably chlorine and/or bromine, x in each case independently of one another, is 0, 1 or 2, p is 1 or 0 and $R^5$ and $R^6$ individually for each $X^1$ and independently of one another denote hydrogen or $C_1$ to $C_6$-alkyl, preferably hydrogen, methyl or ethyl, $X^1$ denotes carbon and m denotes an integer from 4 to 7, preferably 4 or 5, with the proviso that on at least one atom $X^1$, $R^5$ and $R^6$ are simultaneously alkyl.

Preferred diphenols are hydroquinone, resorcinol, dihydroxydiphenols, bis(hydroxyphenyl)-$C_1$-$C_5$-alkanes, bis-(hydroxyphenyl)-$C_5$-$C_6$-cycloalkanes, bis(hydroxyphenyl) ethers, bis-(hydroxyphenyl)sulfoxides, bis-(hydroxyphenyl) ketones, bis(hydroxyphenyl)sulfones and α,α-bis-(hydroxyphenyl)-diisopropyl-benzenes and nucleus-brominated and/or nucleus-chlorinated derivatives thereof. Particularly preferred diphenols are 4,4'-dihydroxydiphenyl, bisphenol A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl sulfone and di- and tetrabrominated or chlorinated derivatives thereof, such as, for example, 2,2-bis-(3-chloro-4-hydroxyphenyl)-propane, 2,2-bis-(3,5-dichloro-4-hydroxyphenyl)propane or 2,2-bis-(3,5-dibromo-4-hydroxyphenyl)-propane. 2,2-bis-(4-hydroxyphenyl)propane (bisphenol A) is particularly preferred. The diphenols may be employed individually or as any desired mixtures. The diphenols are known from the literature or obtainable by processes known from the literature.

Chain terminators which are suitable for the preparation of the thermoplastic, aromatic polycarbonates are, for example, phenol, p-chlorophenol, p-tert-butylphenol or 2,4,6-tribromophenol, and also long-chain alkylphenols, such as 4-[2-(2,4,4-trimethylpentyl)]-phenol, 4-(1,3-tetramethyl-butyl)-phenol according to DE-A 2 842 005 or monoalkylphenols or dialkylphenols having a total of 8 to 20 carbon atoms in the alkyl substituents, such as 3,5-di-tert-butylphenol, p-iso-octylphenol, p-tert-octylphenol, p-dodecylphenol and 2-(3,5-dimethylheptyl)-phenol and 4-(3,5-dimethylheptyl)-phenol. The amount of chain terminators to be employed is in general between 0.5 mol % and 10 mol %, based on the sum of the moles of the particular diphenols employed.

The thermoplastic, aromatic polycarbonates have average weight-average molecular weights ($M_w$, measured e.g. by ultracentrifuge or scattered light measurement) of from 10,000 to 200,000 g/mol, preferably 15,000 to 80,000 g/mol, particularly preferably 24,000 to 32,000 g/mol. The thermoplastic, aromatic polycarbonates may be branched in a known manner, and in particular preferably by incorporation of from 0.05 to 2.0 mol %, based on the sum of the diphenols employed, of compounds which are trifunctional or more than trifunctional, for example those having three and more phenolic groups.

Both homopolycarbonates and copolycarbonates are suitable. It is also possible for 1 to 25 wt. %, preferably 2.5 to 25 wt. %, based on the total amount of diphenols to be employed, of polydiorganosiloxanes having hydroxyaryloxy end groups to be employed for the preparation of copolycarbonates according to the invention according to component A. These are known (U.S. Pat. No. 3,419,634) and may be prepared by processes known from the literature. The preparation of copolycarbonates containing polydiorganosiloxanes is described in DE-A 3 334 782. Preferred polycarbonates are, in addition to the bisphenol A homopolycarbonates, the copolycarbonates of bisphenol A with up to 15 mol %, based on the sum of the moles of diphenols, of other diphenols mentioned as preferred or particularly preferred, in particular 2,2-bis-(3,5-dibromo-4-hydroxyphenyl)-propane.

Aromatic dicarboxylic acid dihalides for the preparation of aromatic polyester carbonates are preferably the diacid dichlorides of isophthalic acid, terephthalic acid, diphenyl ether-4,4'-dicarboxylic acid and of naphthalene-2,6-dicarboxylic acid. Mixtures of the diacid dichlorides of isophthalic acid and of terephthalic acid in a ratio of between 1:20 and 20:1 are particularly preferred. A carbonic acid halide, preferably phosgene, is additionally co-used as a bifunctional acid derivative in the preparation of polyester carbonates. Possible chain terminators for the preparation of the aromatic polyester carbonates are, in addition to the monophenols already mentioned, also chlorocarbonic acid esters thereof as well as the acid chlorides of aromatic monocarboxylic acids, which may optionally be substituted by $C_1$ to $C_{22}$-alkyl groups or by halogen atoms, as well as aliphatic $C_2$ to $C_{22}$-monocarboxylic acid chlorides. The amount of chain terminators is in each case 0.1 to 10 mol %, based on the moles of diphenol in the case of the phenolic chain terminators and on the moles of dicarboxylic acid dichloride in the case of monocarboxylic acid chloride chain terminators. The aromatic polyester carbonates may also contain incorporated aromatic hydroxycarboxylic acids.

The aromatic polyester carbonates may be either linear or branched in a known manner (in this context see DE-A 2 940 024 and DE-A 3 007 934). Branching agents which may be used are, for example, carboxylic acid chlorides which are trifunctional or more than trifunctional, such as trimesic acid trichloride, cyanuric acid trichloride, 3,3',4,4'-benzophenone-tetracarboxylic acid tetrachloride, 1,4,5,8-naphthalenetetracarboxylic acid tetrachloride or pyromellitic acid tetrachloride, in amounts of from 0.01 to 1.0 mol % (based on the dicarboxylic acid dichlorides employed), or phenols which are trifunctional or more than trifunctional, such as phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri(4-hydroxyphenyl)-benzene, 1,1,1-tri-(4-hydroxyphenyl)-ethane, tri-(4-hydroxyphenyl)phenylmethane, 2,2-bis-[4,4-bis-(4-hydroxyphenyl)-cyclohexyl]-propane, 2,4-bis-(4-hydroxyphenyl-isopropyl)-phenol, tetra-(4-hydroxyphenyl)-methane, 2,6-bis-(2-hydroxy-5-methyl-benzyl)-4-methyl-phenol, 2-(4-hydroxyphenyl)-2-(2,4-dihydroxyphenyl)propane, tetra-(4-[4-hydroxyphenyl-isopropyl]-phenoxy)-methane and 1,4-bis-[4,4'-dihydroxytriphenyl)-methyl]-benzene, in amounts of from 0.01 to 1.0 mol %, based on the diphenols employed. Phenolic branching agents may be initially introduced into the reaction vessel with the diphenols, and acid chloride branching agents may be introduced together with the acid dichlorides.

The content of carbonate structural units in the thermoplastic, aromatic polyester carbonates may be varied as desired. Preferably, the content of carbonate groups is up to 100 mol %, in particular up to 80 mol %, particularly preferably up to 50 mol %, based on the sum of ester groups and carbonate groups. Both the ester and the carbonate content of the aromatic polyester carbonates may be present in the polycondensate in the form of blocks or in random distribution.

The relative solution viscosity ($\eta_{rel}$) of the aromatic polycarbonates and polyester carbonates is in the range of 1.18 to 1.4, preferably 1.20 to 1.32 (measured on solutions of 0.5 g polycarbonate or polyester carbonate in 100 ml methylene chloride solution at 25° C.). The thermoplastic, aromatic polycarbonates and polyester carbonates may be employed by themselves or in any desired mixture of one or more, preferably one to three or one or two thereof. Most preferably only one type of polycarbonate is used.

Most preferably the aromatic polycarbonate is a polycarbonate based on bisphenol A and phosgene, which includes polycarbonates that have been prepared from corresponding precursors or synthetic building blocks of bisphenol A and phosgene. These preferred aromatic polycarbonates may be linear or branched due to the presence of branching sites.

Polyamide Component

Suitable polyamides are known homopolyamides, copolyamides and mixtures of such polyamides. They may be semi-crystalline and/or amorphous polyamides.

Suitable semi-crystalline polyamides are polyamide-6, polyamide-6,6, mixtures and corresponding copolymers of those components. Also included are semi-crystalline polyamides the acid component of which consists wholly or partially of terephthalic acid and/or isophthalic acid and/or suberic acid and/or sebacic acid and/or azelaic acid and/or adipic acid and/or cyclohexanedicarboxylic acid, the diamine component of which consists wholly or partially of m- and/or p-xylylene-diamine and/or hexamethylenediamine and/or 2,2,4-trimethylhexamethylenediamine and/or 2,2,4-trimethylhexamethylenediamine and/or isophoronediamine, and the composition of which is in principle known. Mention may also be made of polyamides that are prepared wholly or partially from lactams having from 7 to 12 carbon atoms in the ring, optionally with the concomitant use of one or more of the above-mentioned starting components.

Particularly preferred semi-crystalline polyamides are polyamide-6 and polyamide-6,6 and mixtures thereof. Known products may be used as amorphous polyamides. They are obtained by polycondensation of diamines, such as ethylenediamine, hexamethylenediamine, decamethylenediamine, 2,2,4- and/or 2,4,4-trimethylhexamethylenediamine, m- and/or p-xylylene-diamine, bis-(4-aminocyclohexyl)-methane, bis-(4-aminocyclohexyl)-propane, 3,3'-dimethyl-4,4'-diamino-dicyclohexylmethane, 3-aminomethyl-3,5,5-trimethylcyclohexylamine, 2,5- and/or 2,6-bis-(aminomethyl)-norbornane and/or 1,4-diaminomethylcyclohexane, with dicarboxylic acids such as oxalic acid, adipic acid, azelaic acid, azelaic acid, decanedicarboxylic acid, heptadecanedicarboxylic acid, 2,2,4- and/or 2,4,4-trimethyladipic acid, isophthalic acid and terephthalic acid. Also suitable are copolymers obtained by polycondensation of a plurality of monomers, as well as copolymers prepared with the addition of aminocarboxylic acids such as ε-aminocaproic acid, w-aminoundecanoic acid or w-aminolauric acid or their lactams. Particularly suitable amorphous polyamides are the polyamides prepared from isophthalic acid, hexamethylenediamine and further diamines such as 4,4'-diaminodicyclohexylmethane, isophoronediamine, 2,2,4- and/or 2,4,4-trimethylhexamethylenediamine, 2,5- and/or 2,6-bis-(aminomethyl)-norbornene; or from isophthalic acid, 4,4'-diamino-dicyclohexylmethane and ε-caprolactam; or from isophthalic acid, 3,3'-dimethyl-4,4'-diamino-dicyclohexylmethane and laurinlactam; or from terephthalic acid and the isomeric mixture of 2,2,4- and/or 2,4,4-trimethylhexamethylenediamine. Instead of pure 4,4'-diaminodicyclohexylmethane it is also possible to use mixtures of the position-isomeric diaminodicyclohexylmethanes, which are composed of from 70 to 99 mol % of the 4,4'-diamino isomer, from 1 to 30 mol % of the 2,4'-diamino isomer, from 0 to 2 mol % of the 2,2'-diamino isomer and optionally corresponding to more highly condensed diamines, which are obtained by hydrogenation of industrial grade diaminodiphenylmethane. Up to 30% of the isophthalic acid may be replaced by terephthalic acid.

The polyamides preferably have a relative viscosity (measured on a 1 wt. % solution in m-cresol or 1% (weight/volume) solution in 96 wt. % sulfuric acid at 25° C.) of from 2.0 to 5.0, particularly preferably from 2.5 to 4.0.

SAN and AMSAN Components

Poly(styrene-acrylonitrile) (SAN) and/or poly(α-methyl styrene/acrylonitrile) (AMSAN) may be used as thermoplastic polymer (A-2). In general, any SAN and/or AMSAN copolymer known in in the art may be used within the subject-matter of the present invention. In a preferred embodiment, the SAN and AMSAN copolymers of the present invention contain:

from 50 to 99 wt.-%, based on the total weight of the SAN and/or AMSAN copolymer, of at least one member selected from the group consisting of styrene and α-methyl styrene, and from 1 to 50 wt.-%, based on the total weight of the SAN and/or AMSAN copolymer, of acrylonitrile.

The weight average molecular weight (as determined by gel permeation chromatography relative to polystyrene as standard and THF as solvent) of the SAN or AMSAN copolymer is often in the range of 15,000 to 200,000 g/mol, preferably in the range of 30,000 to 150.000 g/mol.

Particularly preferred ratios by weight of the components making up the SAN or AMSAN copolymer are 60 to 95 wt.-%, based on the total weight of the SAN and/or AMSAN copolymer, of styrene and/or α-methyl styrene and 40 to 5 wt.-%, based on the total weight of the SAN and/or AMSAN copolymer, of acrylonitrile.

Particularly preferred are SAN or AMSAN containing proportions of incorporated acrylonitrile monomer units of <36 wt.-%, based on the total weight of the SAN and/or AMSAN copolymer.

More preferred are copolymers of styrene with acrylonitrile of the SAN or AMSAN type incorporating comparatively little acrylonitrile (not more than 35 wt.-%, based on the total weight of the SAN and/or AMSAN copolymer).

Most preferred are copolymers as component made from, based on from 65 to 81 wt.-%, based on the total weight of the SAN and/or AMSAN copolymer, of at least one member selected from the group consisting of styrene and α-methyl styrene, and from 19 to 35 wt.-%, based on the total weight of the SAN and/or AMSAN copolymer, of acrylonitrile.

Among the afore-mentioned most preferred SAN or AMSAN copolymers those, having a viscosity number VN (determined according to DIN 53726 at 25° C., 0.5% by weight in dimethylformamide) of from 50 to 120 ml/g are in particular preferred.

The copolymers of SAN or AMSAN component are known and the methods for their preparation, for instance, by radical polymerization, more particularly by emulsion, suspension, solution and bulk polymerization are also well documented in the literature.

Details concerning the production of these resins are described for example in U.S. Pat. Nos. 4,009,226 and 4,181,788. Vinyl resins produced by bulk polymerization or solution polymerization have proved to be particularly suitable. The copolymers may be added alone or as an arbitrary mixture.

Organopolysiloxane Compound (Constituent B)

The thermoplastic polymer composition (P) further comprises at least one organopolysiloxane compound (B). It was surprisingly found that the addition of small amounts of at least one organopolysiloxane compound (B) are sufficient to have a positive effect on the residual gloss after scratch or abrasion of a surface prepared from thermoplastic polymer composition (P) according to the invention. In particular, amounts in the range of 0.25 to 5 wt.-% of at least one organopolysiloxane compound are sufficient to achieve the advantageous technical effects.

The organopolysiloxane compound (B) preferably has a high molecular weight, in particular a molecular weight of 100,000 g/mol to 1,000,000 g/mol, determined by gel permeation chromatography (GPC) relative to polystyrene as standard and THF as solvent. In a preferred embodiment, the at least one organopolysiloxane compound (B) is selected from a poly(dialkylsiloxane) compound, in particular a high molecular weight poly(dialkylsiloxane) as defined above, wherein each alkyl group independently comprises 1 to 10 carbon atoms, preferably 1 to 6 carbon atoms and in particular 1 to 4 carbon atoms. Each alkyl group may be linear or branched. Preferred organopolysiloxane compounds (B) are selected from a poly(dimethylsiloxane), a poly(diethylsiloxane), a poly(dipropylsiloxane), a poly(dibutylsiloxane), and mixtures thereof.

Dyes, Pigments, Colorants (Constituent C)

The thermoplastic polymer composition (P) may further comprise 0 to 10 wt.-%, often 0.1 to 5 wt.-% of dyes, pigments, or colorants which may be added in form of master batches comprising the dyes, pigments, or colorants in a polymer matrix.

In a preferred embodiment, the dyes, pigments, or colorants are added in form of a master batch comprising 20 to 70 wt.-%, preferably 40 to 60 wt.-%, based on the total amount of the master batch, of dyes, pigments, colorants or mixtures thereof and 30 to 80 wt.-%, preferably 40 to 60 wt.-%, based on the total amount of the master batch, a copolymer of an vinylaromatic olefin and acrylonitrile as matrix polymer. Preferably, the matrix polymer is selected from poly(styrene-acrylonitrile) (SAN), poly(α-methyl styrene/acrylonitrile) (AMSAN), and/or poly(styrene-methyl methacrylate) (SMMA).

Examples of suitable pigments include titanium dioxide, phthalocyanines, ultramarine blue, iron oxides or carbon black, and also the entire class of organic pigments. Examples of suitable colorants include all dyes that may be used for the transparent, semitransparent, or non-transparent coloring of polymers, in particular those suitable for coloring styrene copolymers.

Additives (Constituent D)

Various additives may be added to the molding compounds in amounts of from 0 to 3 wt.-%, often 0.1 to 3 wt.-%, as assistants and processing additives. Suitable additives (D) include all substances customarily employed for processing or finishing the polymers. In general, the presence of organopolysiloxane compounds (B) does not exclude the presence of additives (D) comprising organopolysiloxane compounds which are different from the organopolysiloxane compounds (B).

Additives (D) may be added in form of master batches comprising additives (D) in a polymer matrix. In a preferred embodiment, the additives (D) are added in form of a master batch comprising 20 to 70 wt.-%, preferably 40 to 60 wt.-%, based on the total amount of the master batch, of additives (D) or mixtures thereof and 30 to 80 wt.-%, preferably 40 to 60 wt.-%, based on the total amount of the master batch, a copolymer of an vinylaromatic olefin and acrylonitrile as matrix polymer. Preferably, the matrix polymer is selected from poly(styrene-acrylonitrile) (SAN), poly(α-methyl styrene/acrylonitrile) (AMSAN), and/or poly(styrene-methyl methacrylate) (SMMA).

Examples of additives (D) include, for example, antistatic agents, antioxidants, flame retardants, stabilizers for improving thermal stability, stabilizers for increasing photostability, stabilizers for enhancing hydrolysis resistance and chemical resistance, anti-thermal decomposition agents and in particular lubricants that are useful for production of molded bodies/articles.

These further added substances may be admixed at any stage of the manufacturing operation, but preferably at an early stage in order to profit early on from the stabilizing effects (or other specific effects) of the added substance. For further customary assistants and added substances, see, for example, "Plastics Additives Handbook", Ed. Hans Zweifel, 6th Edition, Hanser Publishers, Munich, 2009.

Examples of suitable antistatic agents include amine derivatives such as N,N-bis(hydroxyalkyl)alkylamines or -alkyleneamines, polyethylene glycol esters, copolymers of ethylene oxide glycol and propylene oxide glycol (in particular two-block or three-block copolymers of ethylene oxide blocks and propylene oxide blocks), and glycerol mono- and distearates, and mixtures thereof.

Examples of suitable antioxidants include sterically hindered monocyclic or polycyclic phenolic antioxidants which may comprise various substitutions and may also be bridged by substituents. These include not only monomeric but also oligomeric compounds, which may be constructed of a plurality of phenolic units. Hydroquinones and hydroquinone analogs are also suitable, as are substituted compounds, and also antioxidants based on tocopherols and derivatives thereof. It is also possible to use mixtures of different antioxidants. It is possible in principle to use any compounds which are customary in the trade or suitable for styrene copolymers, for example antioxidants from the Irganox® range. In addition to the phenolic antioxidants cited above by way of example, it is also possible to use so-called co-stabilizers, in particular phosphorus- or sulfur-containing co-stabilizers. These phosphorus- or sulfur-containing co-stabilizers are known to those skilled in the art.

Examples of suitable flame retardants that may be used include the halogen-containing or phosphorus-containing compounds known to the person skilled in the art, magnesium hydroxide, and also other commonly used compounds, or mixtures thereof.

Examples of suitable light stabilizers include various substituted resorcinols, salicylates, benzotriazoles and benzophenones.

Suitable matting agents include not only inorganic substances such as talc, glass beads or metal carbonates (for example $MgCO_3$, $CaCO_3$) but also polymer particles, in particular spherical particles having diameters $D_{50}$ greater than 1 μm, based on, for example, methyl methacrylate, styrene compounds, acrylonitrile or mixtures thereof. It is further also possible to use polymers comprising copolymerized acidic and/or basic monomers.

Examples of suitable antidrip agents include polytetrafluoroethylene (Teflon) polymers and ultrahigh molecular weight polystyrene (weight-average molecular weight Mw above 2,000,000 g/mol).

Examples of fibrous/pulverulent fillers include carbon or glass fibers in the form of glass fabrics, glass mats, or filament glass rovings, chopped glass, glass beads, and wollastonite, particular preference being given to glass fibers. When glass fibers are used they may be finished with a sizing and a coupling agent to improve compatibility with the blend components. The glass fibers incorporated may either take the form of short glass fibers or else continuous filaments (rovings).

Examples of suitable particulate fillers include carbon black, amorphous silica, magnesium carbonate, powdered quartz, mica, bentonites, talc, feldspar or, in particular, calcium silicates, such as wollastonite, and kaolin.

Examples of suitable stabilizers include hindered phenols but also vitamin E and compounds having analogous structures and also butylated condensation products of p-cresol and dicyclopentadiene. HALS stabilizers (Hindered Amine Light Stabilizers), benzophenones, resorcinols, salicylates, benzotriazoles are also suitable. Other suitable compounds include, for example, thiocarboxylic esters. Also usable are $C_6$-$C_{20}$) alkyl esters of thiopropionic acid, in particular the stearyl esters and lauryl esters. It is also possible to use the dilauryl ester of thiodipropionic acid (dilauryl thiodipropionate), the distearyl ester of thiodipropionic acid (distearyl thiodipropionate) or mixtures thereof. Examples of further additives include HALS absorbers, such as bis(2,2,6,6-tetramethyl-4-piperidyl) sebacate or UV absorbers such as 2H-benzotriazol-2-yl-(4-methylphenol).

Suitable lubricants and demolding agents include stearic acids, stearyl alcohol, stearic esters, polyolefin waxes and/or generally higher fatty acids, derivatives thereof and corresponding fatty acid mixtures comprising 1 to 45 carbon atoms. In a further preferred embodiment the composition comprises amide compounds having the formula $R^1$—CONH—$R^2$, wherein $R^1$ and $R^2$ are each independently selected from aliphatic, saturated or unsaturated hydrocarbon groups having 1 to 30 carbon atoms, preferably 12 to 24 carbon atoms, in particular 16 to 20 carbon atom. In a further preferred embodiment of the invention, the composition may additionally comprise fatty acid ester compounds having the formula $R^3$—CO—$OR^4$, wherein $R^3$ and $R^4$ are each independently selected from aliphatic, saturated or unsaturated hydrocarbon groups having 1 to 45 carbon atoms, preferably 15 to 40 carbon atoms, in particular 25 to 35 carbon atoms. Also particularly suitable is ethylene-bis (stearamide).

In a further preferred embodiment, the thermoplastic polymer composition (P) may comprise an organic, inorganic or mixed phosphate, in particular an alkaline metal or earth alkaline metal phosphate such as $Ca_3(PO_4)_2$ and/or an organophosphate having alkyl or aryl groups comprising 1 to 12 carbon atoms. These phosphates may be conveniently added in form of a masterbatch, e.g. in combination with polyolefin waxes and/or olefin/styrene copolymers.

In a further preferred embodiment, thermoplastic polymer composition (P) may further comprise a polyester modified polysiloxane, in particular a polyester-polysiloxane-block copolymer, preferably a [polyester-b-polysiloxane-b-polyester] triblock copolymer. Preferred examples of the polysiloxane moieties comprised in the polyester-polysiloxane-blockcopolymer are derived from poly(dimethylsiloxane), poly(diethylsiloxane), poly(dipropylsiloxane), poly(dibutylsiloxane), and mixtures thereof.

Preparation of the Thermoplastic Polymer Composition (P)

The invention also relates to a process for preparing a thermoplastic polymer composition (P) disclosed above, wherein the process comprises at least the following steps:
a) Providing the components (A) to (D) in the predetermined amounts to an optionally heatable mixing device; and
b) Blending the components (A) to (D) in the optionally heatable mixing device at temperatures above the glass transition point of the components (A) to (D) to obtain the thermoplastic polymer composition (P).

Optionally, a step in which a homogenous particulate material mixture is prepared from the components (A) to (D) may be carried out prior to step b). However, also when provided to the optionally heatable mixing device without previous mixing, a homogenous mixing is typically achieved in the optionally heatable mixing device.

Components (A) to (D) are typically provided in form of particulate materials having different particle sizes and particle size distributions. Typically, the components are provided in form of powders and/or granules.

The particulate materials (A) to (D) are provided to a mixing device in the required amounts and ratios as previously indicated and optionally mixed prior to the blending step b) in order to obtain a homogenous particulate material mixture. This may require 1 to 60, preferably 1 to 20, in particular 2 to 10 minutes, depending to the amount of particulate material to be mixed.

The thus obtained homogenous particulate material mixture is then transferred to an optionally heatable mixing apparatus and blended therein, producing a substantially liquid-melt polymer mixture.

"Substantially liquid-melt" means that the polymer mixture, as well as the predominant liquid-melt (softened) fraction, may further comprise a certain fraction of solid constituents, examples being unmelted fillers and reinforcing material such as glass fibers, metal flakes, or else unmelted pigments, colorants, etc. "Liquid-melt" means that the polymer mixture is at least of low fluidity, therefore having softened at least to an extent that it has plastic properties.

Mixing apparatuses used are those known to the skilled person. Components (A) and (B), and—where included—(C) and/or (D) may be mixed, for example, by joint extrusion, kneading, or rolling, the aforementioned components necessarily having been isolated from the aqueous dispersion or from the aqueous solution obtained in the polymerization.

Examples of mixing apparatus for implementing the method includes discontinuously operating, heated internal kneading devices with or without RAM, continuously operating kneaders, such as continuous internal kneaders, screw kneaders with axially oscillating screws, Banbury kneaders, furthermore extruders, and also roll mills, mixing roll mills with heated rollers, and calenders.

A preferred mixing apparatus used is an extruder or a kneader. Particularly suitable for melt extrusion are, for example, single-screw or twin-screw extruders. A twin-screw extruder is preferred. In some cases the mechanical energy introduced by the mixing apparatus in the course of mixing is enough to cause the mixture to melt, meaning that the mixing apparatus does not have to be heated. Otherwise, the mixing apparatus is generally heated.

The temperature is guided by the chemical and physical properties of the styrene-based polymer composition (A) and the poly(siloxane) compound (B) and—when present—the colorant or colorant master batch (C) and/or the further additives (D), and should be selected such as to result in a substantially liquid-melt polymer mixture. On the other hand, the temperature is not to be unnecessarily high, in order to prevent thermal damage of the polymer mixture. The mechanical energy introduced may, however, also be high enough that the mixing apparatus may even require cooling. Mixing apparatus is operated customarily at 150 to 400, preferably 170 to 300° C.

In a preferred embodiment a heatable twin-screw extruder and a speed of 50 to 150 rpm, preferably 60 to 100 rpm is employed. Preferably, an extruding temperature of 170 to 270° C., preferably 210 to 250° C. is employed to obtain the thermoplastic polymer composition (P). The thermoplastic polymer composition (P) may be directly used, e.g. in moulding processes, preferably injection moulding processes, or may be processed to form granules which may be subjected to moulding processes afterwards. The moulding processes are preferably carried out at temperatures of 170 to 270° C., in particular 210 to 250° C. to result in polymer moulded articles.

Processing may be carried out using the known processes for thermoplastic processing, in particular production may be effected by thermoforming, extruding, injection molding, calendaring, blow molding, compression molding, press sintering, deep drawing or sintering, preferably by injection molding.

The invention further relates to a molded article, prepared from a thermoplastic polymer composition (P) or a polymer composition, comprising a thermoplastic polymer composition (P) in combination with a further thermoplastic polymer as described above. The molded article may be prepared by any known processes for thermoplastic processing. In particular preparation may be effected by thermoforming, extruding, injection molding, calendaring, blow molding, compression molding, press sintering, deep drawing or sintering, preferably by injection molding.

The thermoplastic polymer composition (P) and the molded articles are advantageously used for the manufacture of components or articles for electronic devices, household goods and exterior and/or interior automotive parts, in particular for the manufacture of visible components or articles. A preferred application is the use in A/B/C pillars of automobiles.

The properties of the thermoplastic polymer composition (P) according to the present invention were determined. It was surprisingly found by the present inventors that the thermoplastic polymer composition (P) comprising 0.25 to 5 wt.-% of at least one organopolysiloxane compound combines improved residual gloss properties after abrasion in combination with an improved melt volume-flow rate (MVR). On the other hand, properties of the thermoplastic polymer composition (P) remain constant with respect to heat resistance and notched impact strength. This is in particular unexpected since an increase in melt volume-flow rate is typically accompanied by deterioration in notched impact strength. However, it was surprisingly found that this is not the case in the thermoplastic polymer composition (P) according to the present invention.

As regards the gloss, the surfaces of samples prepared from the thermoplastic polymer composition (P) according to the invention preferably exhibit a residual gloss of more than 15%, preferably more than 20%, more preferably more than 25%, and in particular more than 30% after abrasion was effected according to norm PV3975 compared to the surface of the non-abraded thermoplastic polymer composition (P).

Concerning the melt characteristics of the thermoplastic polymer composition (P) according to the invention, a melt volume-flow rate (MVR, 220 ml/10 min according to ISO 1133), which is increased by a factor of at least 1.5, preferably by a factor of at least 3, in particular by a factor of ≥3 and ≤5, compared to the melt volume-flow rate of a thermoplastic polymer composition which does not comprise the at least one organopolysiloxane compound (B).

In a further embodiment, the heat resistance, determined as the Vicat softening temperature (VST B50, according to DIN EN ISO 306), of the thermoplastic polymer composition (P) is reduced by less than 5° C. preferably less than 3° C., most preferably less than 1° C., compared to the Vicat softening temperature of a thermoplastic polymer composition which does not comprise the at least one organopolysiloxane compound (B).

In a further embodiment of the invention, the Charpy notched impact strength (determined according to DIN EN ISO 179-1/1eA) of the thermoplastic polymer composition (P) according to the present invention is reduced by less than 4 kJ/m², preferably less than 2 kJ/m², most preferably less than 1 kJ/m² when compared to the Charpy notched impact strength of a thermoplastic polymer composition which does not comprise the at least one organopolysiloxane compound (B).

The invention is further illustrated by the claims and examples.

EXAMPLES

Materials
Constituents A, C and D:
The styrene-based polymer constituent (A) was provided in form of a blend having the following composition A*:
23.64 wt.-% AMSAN having an acrylonitrile content of 30 wt.-%;
33.14 wt.-% SAN having an acrylonitrile content of 35 wt.-%;
19.32 wt.-% ASA graft rubber having a mean particle diameter $D_{50}$ of 90 nm; and
12.75 wt.-% ASA graft rubber having a mean particle diameter $D_{50}$ of about 550 nm.

The constituent (A) consisted to 88.85 wt.-% of the above described polymer composition A* and further comprised 9.70 wt.-% of a colorant constituent (C) in form of a colorant master batch comprising 20 wt.-% carbon black in a SAN copolymer matrix. Furthermore, 1.45 wt.-% of additive constituents (D) were present in constituent (A) in form of lubricants (polyethylene wax), plasticizers (DPHP IBC), light stabilizers (Tinuvin 770, BASF) and further stabilizers (Cyasorb 3853). Constituent (A) is commercial available from INEOS Styrolution Group GmbH, Germany.

Constituent B:
The polysiloxane constituent (B) was provided in form of a master batch comprising 50 wt.-% of a ultra high molecular weight siloxane polymer dispersed in a poly(styrene-acrylonitrile) (SAN) carrier. The master batch is commercially available (Dow Corning® MB50-008 Masterbatch).

Sample Preparation
The samples according to Examples 1 to 3 were prepared by compounding constituents A, C, D and B using a twin screw extruder (model ZSK26MC, Coperion GmbH, length: 1035 mm) at $T_m$=240° C. according to the specific ratios given in Table 1 below. DIN A5 size samples have been prepared via injection molding ($T_m$: 242° C.).

Comparative Example 1 was prepared by producing DIN A5 size samples of the constituents A, C and D (see Table 1) prior to the addition of with Dow Corning® MB50-008 Masterbatch via injection molding ($T_m$: 242° C.).

Comparative Example 2 was prepared by producing DIN A5 size samples of poly(methyl methacrylate) (Plexiglas® 7N, available from Evonik Performance Materials GmbH, Germany) via injection molding ($T_m$: 242° C.).

The composition of the samples according to Example 1 to 3 and Comparative Example 1 are given in Table 1.

TABLE 1

| Constituent | Ex. 1 (wt.-%) | Ex. 2 (wt.-%) | Ex. 3 (wt.-%) | Comp. Ex. 1 (wt.-%) |
|---|---|---|---|---|
| Constituent A | | | | |
| Composition described above including (A), (C) and (D) | 98.0 | 97.0 | 96.0 | 100 |
| Constituent B | | | | |
| poly(siloxane) | 1 | 1.5 | 2 | — |
| SAN | 1 | 1.5 | 2 | — |

Testing Methods
The properties of the thermoplastic polymer compositions (P) were evaluated by the following testing methods. The same methods were applied to determine the properties of the constituents (A) to (D), where necessary.

Residual Gloss
Abrasion was effected according to testing Norm PV3975. A Martindale abrasion tester was used with 281Q WOD abrasive paper (9 mic, 215.9 mm*279 mm, 3M). All samples have been conditioned at 18-28° C./50% relative humidity for 7 days. The number of cycles during testing was 10 with a load of 12 kPa. After abrasion, gloss was measured at 20° using a Multigloss 268 (Konica Minolta). Gloss retention (residual gloss) is calculated as follows:

$$\text{residual gloss} = \frac{\text{gloss after testing}}{\text{initial gloss}}$$

Melt volume-flow rate (MVR 220° C./10 kg) was measured according to ISO 1133.

Charpy notched impact strength was measured according to DIN EN ISO 179-1/1eA. Heat resistance (VST B50) was measured according to DIN EN ISO 306.

The mean particle diameter $D_{50}$ may be determined by ultracentrifuge measurements (see W. Scholtan, H. Lange: Kolloid Z. & Z. Polymere 250, p. 782 to 796 (1972)). The weight average molecular weight Mw was determined by gel permeation chromatography using UV-detection. Polystyrene was used as standard. Typically, tetrahydrofuran was used as solvent. The test results are summarized in Table 2.

TABLE 2

| Example | Residual gloss [%] | MVR 220/10 [ml/10 min] | Charpy notched impact strength [kJ/m²] | Vicat softening point (VST B50) [° C.] |
|---|---|---|---|---|
| Ex. 1 | 23.9 | 13.68 | 14.86 | 104 |
| Ex. 2 | 22.3 | 14.35 | 14.75 | 103 |

TABLE 2-continued

| Example | Residual gloss [%] | MVR 220/10 [ml/10 min] | Charpy notched impact strength [kJ/m²] | Vicat softening point (VST B50) [° C.] |
|---|---|---|---|---|
| Ex. 3 | 32.5 | 14.65 | 13.56 | 102 |
| Comp. Ex. 1 | 8.9 | 4.3 | 14.9 | 103 |
| Comp. Ex. 2 | 35.9 | — | — | — |

The experimental data summarized in Table 2 show that the addition of small amounts of the polysiloxane compound (B) according to the invention to the styrene-based polymer composition is able to have a dramatic improvement with respect to the residual gloss of the test samples of Examples 1 to 3 compared to Comparative Example 1, whereas the melt volume-flow rate (MVR) is also substantially improved by a factor of about 3.

Moreover, Charpy notched impact strength as well as heat resistance (determined as Vicat softening point) of the test samples prepared in accordance to the invention are not adversely affected by the addition of polysiloxane compound (B). The thus obtained improved characteristics of the thermoplastic polymer composition (P) according to the present invention turn the copolymer composition to a convenient and inexpensive alternative to poly(methylmethacrylate) compositions and/or UV-cured surfaces in applications such as housings of household goods and electronic devices as well as interior parts in the automotive industry.

The invention claimed is:

1. A thermoplastic polymer composition (P) comprising:
(A) 82 to 99.75 wt.-% of at least one styrene-based polymer composition (A) comprising:
  (A-1) 30 to 40 wt.-%, based on the total weight of the styrene-based polymer composition (A), of at least two styrene-based graft copolymers (A-1), wherein the graft copolymer (A-1) is poly(acrylonitrile-styrene-acrylic ester) (ASA), wherein the graft copolymer (A-1) comprises at least two graft copolymers (A-1-I) and (A-1-II), wherein:
    (i) graft copolymer (A-1-I) comprises ASA rubber particles having a mean particle diameter $D_{50}$ from 50 to 180 nm, and
    (ii) graft copolymer (A-1-II) comprises ASA rubber particles having a mean particle diameter $D_{50}$ from 200 to 800 nm, and
  (A-2) 60 to 70 wt.-%, based on the total weight of the styrene-based polymer composition (A), of a thermoplastic polymer (A-2) comprising 40 to 60 wt.-% of polystyrene-acrylonitrile) (SAN) and 60 to 40 wt.-% poly(α-methyl styrene-acrylonitrile) (AM-SAN), based on the total weight of the thermoplastic polymer (A-2);
(B) 0.25 to 18 wt.-% of at least one organopolysiloxane compound selected from a poly(dialkylsiloxane) compound with each alkyl group independently comprising 1 to 10 carbon atoms and having a weight average molecular weight Mw of 100,000 g/mol to 1,000,000 g/mol, determined by gel permeation chromatography (GPC) relative to polystyrene as standard and THF as solvent;
(C) 0 to 10 wt.-% of at least one colorant, dye, or pigment; and
(D) 0 to 3 wt.-% of at least one further additive;
wherein the constituents (A) to (D) sum up to 100 wt.-% of the thermoplastic polymer composition (P).

2. The thermoplastic polymer composition (P) according to claim 1 comprising:
(A) 89 to 98.5 wt.-% of a styrene-based polymer composition (A) comprising t least one graft copolymer (A-1);
(B) 0.5 to 10 wt.-% of at least one organopolysiloxane compound;
(C) 0.5 to 5 wt.-% of at least one colorant, dye or pigment; and
(D) 0.5 to 3 wt.-% of at least one further additive;
wherein the constituents (A) to (D) sum up to 100 wt.-% of the thermoplastic polymer composition (P).

3. The thermoplastic polymer composition (P) according to claim 1, wherein the organopolysiloxane compound (B) is selected from poly(dimethylsiloxane), poly(diethylsiloxane), poly(dipropylsiloxane), poly(dibutylsiloxane), and mixtures thereof.

4. The thermoplastic polymer composition (P) according to claim 1, wherein the surface of the thermoplastic polymer composition (P) has a residual gloss of more than 30% after abrasion was effected according to norm PV3975 compared to the surface of the non-abraded thermoplastic polymer composition (P).

5. The thermoplastic polymer composition (P) according to claim 1, wherein the melt volume-flow rate (MVR, 220 ml/10 min according to ISO 1133) of the thermoplastic polymer composition (P) is increased by a factor of at least 1.5 compared to the melt volume-flow rate of a thermoplastic polymer composition which does not comprise the at least one organopolysiloxane compound (B).

6. The thermoplastic polymer composition (P) according to claim 1, wherein the Vicat softening temperature (VST B50, according to DIN EN ISO 306) of the thermoplastic polymer composition (P) is reduced by less than 5'C compared to the Vicat softening temperature of a thermoplastic polymer composition which does not comprise the at least one organopolysiloxane compound (B).

7. The thermoplastic polymer composition (P) according to claim 1, wherein the Charpy notched impact strength of the thermoplastic polymer composition (P) is reduced by less than 4 kl/m², compared to the Charpy notched impact strength of a thermoplastic polymer composition which does not comprise the at least one organopolysiloxane compound (B).

8. A process for preparing a thermoplastic polymer composition (P) according to claim 1, wherein the process comprises at least the following steps:
  a) providing the components (A) to (D) in the predetermined amounts to an optionally heatable mixing device; and
  b) blending the components (A) to (D) in the optionally heatable mixing device at temperatures above the glass transition point of the components (A) to (D) to obtain the thermoplastic polymer composition (P).

9. A molded article, prepared from a thermoplastic polymer composition (P) according to claim 1.

10. A method of making components or articles for electronic devices, household goods, and automotive parts comprising the thermoplastic polymer composition (P) according to claim 1.

11. A method of making components or articles for electronic devices, household goods, and automotive parts comprising the molded article according to claim 9.

12. The molded article according to claim 9, wherein the molded article is a component or article for electronic devices, household goods, and automotive parts.

13. The thermoplastic polymer composition (P) according to claim 1, wherein the thermoplastic polymer composition (P) comprises as constituent (B) 0.25 to 12 wt.-% of the at least one organopolysiloxane compound.

14. The thermoplastic polymer composition (P) according to claim 1, wherein the thermoplastic polymer composition (P) comprises as constituent (B) 0.25 to 5 wt.-% of the at least one organopolysiloxane compound.

15. The thermoplastic polymer composition (P) according to claim 1, wherein the thermoplastic polymer composition (P) comprises as constituent (B) 0.25 to 6 wt.-% of the at least one organopolysiloxane compound.

16. The thermoplastic polymer composition (P) according to claim 1, wherein the thermoplastic polymer composition (P) comprises as constituent (B) 0.25 to 3 wt.-% of the at least one organopolysiloxane compound.

* * * * *